Figure 1:
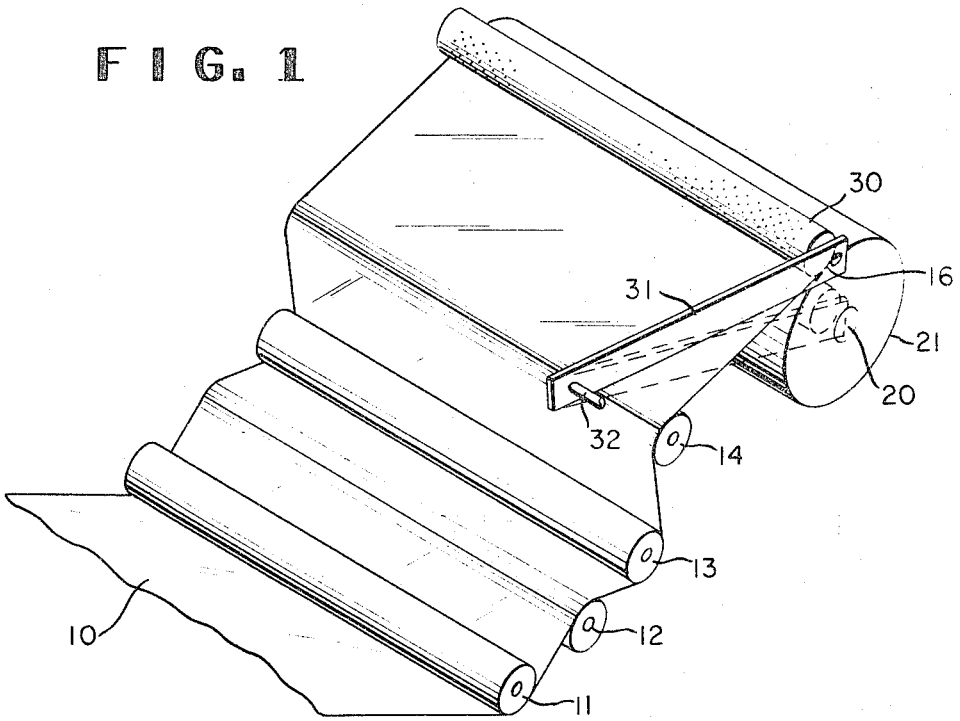
Figure 2:
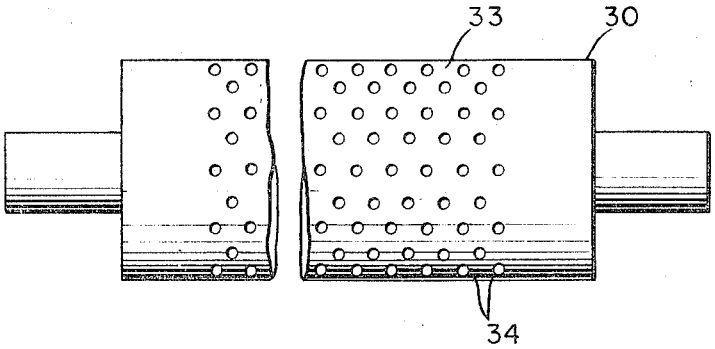

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 15, 1972

901 O.G. 778

T901,029
METHOD OF AND APPARATUS FOR WINDING A WEB OF MATERIAL

Gordon W. Thompson, Clinton, Iowa, assignor to E. I. du Pont de Nemours and Company, Wilmington, Del.

Continuation of application Ser. No. 814,711, Apr. 9, 1969. This application May 6, 1971, Ser. No. 140,982
Int. Cl. B65h *23/16*
U.S. Cl. 242—55
1 Sheet Drawing. 11 Pages Specification

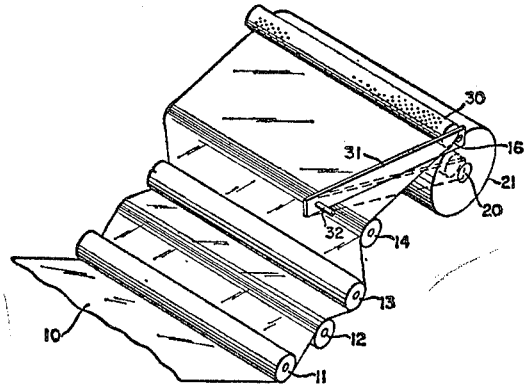

Method of continuously winding a web of sheet material, such as plastic film onto a windup roll including the step of forcing air from between the layers of the web as it is wound by selectively pressing the web against the windup roll with a pressure roll having a predetermined solid area defining open areas therebetween whereby a predetermined amount of air is left between the layers to control the hardness of the wound roll.

Apparatus is provided for performing this method of winding. In such apparatus, the open surface areas of the contact roll generally constitute from 5% to 65% of the total surface area of such roll and, preferably, from 30% to 36% thereof.

METHOD OF AND APPARATUS FOR WINDING A WEB OF MATERIAL

Original Filed April 9, 1969

INVENTOR
GORDON W. THOMPSON

BY Hugo S. Sutherland
ATTORNEY